Feb. 26, 1952     L. W. MILLSAP     2,586,976
POWER-DRIVEN FILM REWIND MACHINE
Filed June 16, 1945
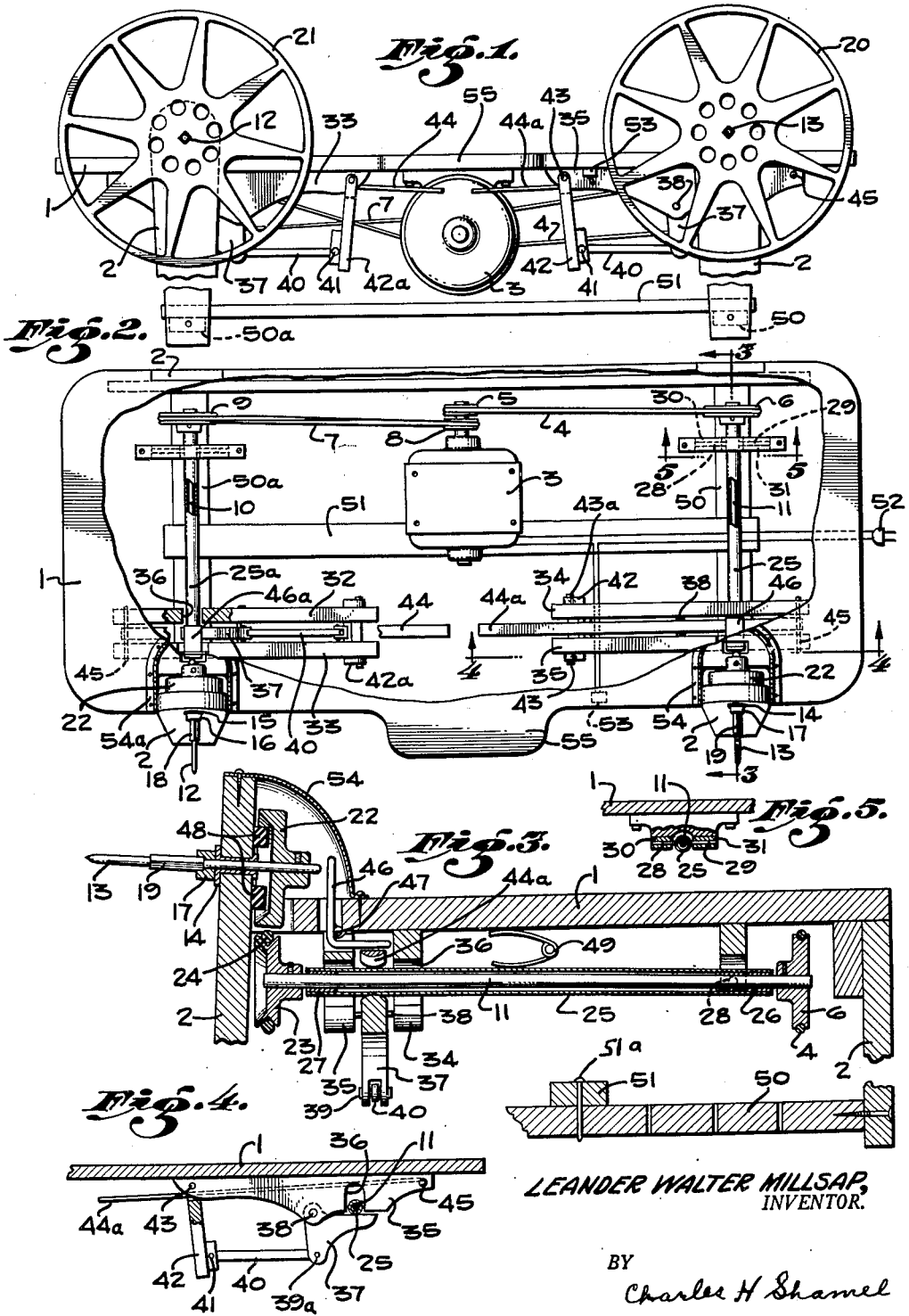
LEANDER WALTER MILLSAP,
INVENTOR.
BY
Charles H Shamel
HIS ATTORNEY Patented Feb. 26, 1952

2,586,976

UNITED STATES PATENT OFFICE 2,586,976

POWER-DRIVEN FILM REWIND MACHINE

Leander Walter Millsap, Los Angeles, Calif.

Application June 16, 1945, Serial No. 599,917

7 Claims. (Cl. 242—55)

This invention relates to improvements in power driven film rewind machines of the type consisting of spindles and supports for rotating film-carrying reels while the film is being wound and rewound, preparatory to and after its use on projectors, or in the processes of editing, inspecting and repairing it.

In the manufacture and use of motion picture films it is necessary to wind the films onto reels and to transfer them from one reel to another. This rewinding and transferring takes place at the studio where films are prepared, also where they are edited or changed, where they are kept for rental, where they are inspected, and where they are exhibited.

After each exhibition of a film, it must be rewound in order to bring the front end of the film to the outside of the reel, and during the rewinding operation, the film must be inspected for breaks, bad sprocket holes and tears, and it must be repaired wherever necessary.

The present invention relates to a new and improved machine of the type above indicated, and has for its object the production of a machine, that will be reliable in its operation, speedy, sensitive to control, convenient to the operator, and that will allow the operator's arms to be placed in a non-tiring position.

The above and other objects of this invention which may become apparent as this description proceeds, I attain by a construction and an arrangement of parts that I will now describe in detail, and for this purpose, reference is made to the accompanying drawings, in which a preferred construction of the machine is illustrated, and in which:

Fig. 1 is a front elevation of the machine with parts of the legs which support the same cut away, and showing the film-carrying reels on the spindles.

Fig. 2 is a plan view of the top of the machine with enough of the top cut away to show the working parts beneath, and with the film-carrying reels removed to show the spindles.

Fig. 3 is an end view of a section of Fig. 2 on line 3—3.

Fig. 4 is a front elevation of a part of the mechanism beneath the top of the right end of the supporting table, with the table leg, the spindle, and the drive pulleys cut away. There is a precisely similar mechanism beneath the top of the left end of the supporting table.

Fig. 5 is a cross section on line 5—5 of a part of the driving mechanism at the right end of the table. There is a precisely similar mechanism in the same position at the left end of the table.

In the drawings, reference numeral 1 designates the top of the table which supports the entire mechanism, the same being attached mostly to the underside thereof. Numerals 2, 2, 2, 2, indicate the legs which support the machine in the same way that the legs of an ordinary table support the top thereof.

Numeral 3 indicates an electric motor or other motor which drives the mechanism and which may be any suitable type of motor.

Numeral 4 indicates a belt which may be of any convenient type, and which extends from pulley 5 to the pulley 6 on the right countershaft 11.

Numeral 7 indicates a belt which extends from pulley 8 to pulley 9 on the left countershaft 10. This belt is crossed so that it imparts to countershaft 10 a rotation opposite to that imparted to countershaft 11 by belt 4.

Numerals 12 and 13 are spindles supported by bearings 14 and 15 which in turn are inserted in the tops of the table legs 2, 2, extended upward on the front of the table.

Numerals 16 and 17 are collars which hold the reels 20 and 21 away from the table legs so that they may revolve freely without striking.

Numerals 18 and 19 are means for causing the spindles to rotate the film-carrying reels. These means may be keys fixed to the spindles and designed to slip into corresponding loose fitting key seats in the reels, or they may be squared portions of the spindles fitting corresponding holes in the reels, or any other convenient means.

Numerals 20 and 21 are film-carrying reels that may be slipped on or off of spindles 12 and 13 at will, and are caused to rotate with the spindles when in place by the devices 18 and 19 mentioned above.

Numeral 22 is a pulley keyed to the rear end of spindle 13 behind the upward extended table leg 2 and which has a flat or slightly grooved periphery.

Numeral 23 is a pulley with a grooved periphery keyed to the end of countershaft 11 and carrying in the groove a tire 24, of rubber or other suitable material.

Numeral 25 is a tubular housing through which passes countershaft 11, supported by bearings 26 and 27 in housing 25. Numeral 25a is a similar housing enclosing countershaft 10.

Numerals 28 and 29 are trunnions fixed in housing 25 and supported by bearings 30 and 31, Fig. 5.

A similar assembly at the left side of the table comprising countershaft 10 and pulley 9 have precisely the same parts and function as those last described above which functions are more fully set forth hereafter.

Numerals 34 and 35 are supports for the mechanism hereafter described, which moves pulley 23 on countershaft 11 into contact with pulley 22, and the corresponding mechanism in connection with countershaft 10 is supported by 32 and 33.

Numeral 36 is a notch in piece 35 which allows free motion upward and downward of the housing in connection with countershaft 11 which is similar to housing 25a shown in Figure 2, and prevents any lateral motion of the same.

There is a similar assembly of levers etc. in the corresponding position at the left side of the table.

Numeral 37 is an approximately right angled lever which is pivoted on a pin 38 through supports 34 and 35 and is connected by pin 39a to a bar 40 which is connected by pin 41 to knee lever 42 which in turn is suspended from and movable on studs 43 and 43a in supports 34 and 35. Numeral 42a is a similar lever for the left knee of the operator.

Numeral 44a is a flat metal lever free at one end and pivoted at the opposite end on pin 45. There is a similar lever 44 in a corresponding position at the opposite side of the table.

Numeral 46 is an approximately right angled flat lever pivoted on pin 47. There is a similar lever 46a on the left side.

Numeral 48 is a brake disc or block lying between pulley 22 and table leg 2.

Numeral 49 is a spring which presses downward on housing 25 which in turn carries countershaft 11 and pulley 23 and tire 24 away from pulley 22. There is a similar spring in connection with housing 25a and countershaft 10 at the left side of table.

Numerals 50 and 50a are cross bars connecting the forward and rear legs 2, together.

Numeral 51 is a footrest lying at each of its ends on top of cross bars 50 and 50a and movable to various positions on bars 50 and 50a.

Numeral 51A is a pin which holds the foot rest 51 at various positions, as desired, on crossbars 50 and 50A by being placed in the various holes in said crossbars shown in Fig. 3.

Numeral 52 is an ordinary attachment plug for attaching the motor to a current-carrying cord.

Numeral 53 is an ordinary electric switch for stopping and starting the motor.

Numeral 54 Fig. 3 is a cover which protects the moving parts. There is a similar cover 54a which protects the moving parts at the left end of the table.

Numeral 55 is part of table top 1 which extends toward the operator under the film between reels enabling a film splicing device to be placed directly under the strip of film stretching between reels.

The operation of the preferred form of my film winding and rewinding mechanism is substantially as follows: A film after being projected is left wound on the take-up reel with the latter end of the film at the outside, commonly referred to as "tails out." Assume that such a reel is represented by numeral 20 of Fig. 1. It will then be placed on spindle 13 at the right and of Fig. 1. The free end of the film which is the "tail" is now brought over to the left and attached to the hub of empty reel 21, similarly mounted on spindle 12.

It will be noted that spindles 12 and 13 are inclined slightly upward from the horizontal, preferably approximately 5 degrees.

The operator is seated in front of the machine with his knees under the top 1 of the table. In this position his left knee can be readily pressed against the lever 42a, and when raised slightly, this knee will press against lever 44. His right knee will be in a corresponding position with reference to levers 42 and 44a. The operator then starts motor 3 by switch 53 so that thereafter pulley 23 and corresponding pulley on countershaft 10 are rotating continuously.

When he presses with his right knee against lever 42, bar 40 actuates right angled lever 37 through pin 39a. This causes the horizontal arm of right angled lever 37 to move upward, thus raising the rotating pulley 23 on countershaft 11, so that the rubber tire of this rotating pulley comes into contact with the flat periphery of the pulley 22 on the rear end of spindle 13 and thereby causes the latter to revolve to the right at full speed or at any speed between zero and full speed, depending upon the amount of pressure applied. When he presses with his left knee against lever 32a, the tire of the pulley on countershaft 10 corresponding to tire 24, Fig. 3 contacts the periphery of the pulley on the rear of spindle 12 which contact may be variable allowing more or less slippage with corresponding variations of relative speeds, thus allowing the spindle 12 and the reel mounted upon it to be revolved in its bearing at any speed up to full speed, at will.

The motion of countershaft 11, its housing 25 and attached parts is possible because the rear end of housing 25 is supported by trunnions 28 and 29, Fig. 5 and these in turn by bearings 30 and 31, Fig. 5. A similar assembly supports the countershaft 10.

While reel 21 is rewinding the film, the motion can be stopped or retarded as may be desired by a combination of motions as follows: Pressure of the operator's knee against lever 42a may be relaxed causing less power to be applied to reel 21, and at the same time, the operator by raising his right knee, may apply pressure to flat metal lever 44a which in turn raises the horizontal arm of the right-angled lever 46 turning on pin 47 and thereby pressing the perpendicular arm of lever 46 against the rounded end of spindle 13 which in turn presses pulley 22 against brake block 48. It is assumed that the film is continuous from one reel to the other. Therefore, the retarding of reel 20 will control the speed of both reels.

In the event of the film breaking between reels, then the operator may stop reel 21 by relaxing the side pressure of his left knee against lever 42a and at the same time raising the left knee against lever 44 to apply the brake on spindle 12. At the same time the spinning of reel 20 can be brought to a stop by raising the right knee against lever 44a. In such an event or whenever it is desirable to splice the ends of the film together, the splicer, which is a separate device in common use, rests on the extension 55 of table top 1 and is in the most convenient position for use.

It will be noted that this mechanism and the above described method of using it leaves the sprocket holes and the sound track of the film in the same relative positions on the rewinding machine as they occupy on the projector, thus making unnecessary the transposition of the reels with a corresponding reversal of the relative positions of the sprocket holes and the sound track, which must occur when the reels are placed on spindles which project away from the operator as in all hand operated rewind devices.

By means of this mechanism and method of control, the film in its normal position can be moved at will to the left or to the right, fast or slow, and it may be stopped or started, or either or both reels may be allowed to turn free of all hinderance when it is desirable to turn them by hand or when it is desired to pull up a loop of film to facilitate the inspection of some scene or damaged spot. The film may by means of these control levers be pulled slowly either to the right or left while being allowed to slip through the fingers of the operator while he is feeling it for broken sprocket holes or torn edges or bad splices.

Spring 49 on housing 25 pushes housing 25 and its contained countershaft 11 downward so that pulley 23 and its tire 24 are held free of pulley 22 on spindle 13 except when this action is counteracted by the pressing of the operator's knee against lever 42. The similar spring on housing 25a has similar action in reference to spindle 12. When the motor is running, the countershafts 10 and 11 are constantly revolving but do not operate the spindles until raised by levers 42 or 42a as above described.

The cross bars 50 and 50a support the adjustable foot rest 51. On this the operator's feet are placed while his legs and knees are operating the levers as above described. The adjustability of these parts make it possible to adapt the mechanism to the legs of different operators.

The above described mechanism provides means by which power may be applied to the winding and rewinding of films for any purpose necessary, and controlled in the ways that are necessary in the processes of editing, inspecting, patching, and transferring from one reel to another, the films. This machine may be used for handling 16 mm., 35 mm. or 8 mm. films.

When the film carrying reels are on the spindles of the machine they can in addition to their operation by the mechanism as described above, be rotated by hand or retarded by hand in the usual ways, while the film is being inspected, edited or repaired.

Although I have described a certain preferred specific embodiment of my invention, I am fully aware that many modifications thereof are possible. My invention therefore, is not to be restricted except in so far as is necessitated by the prior art and the appended claims. What I claim as new and desire to secure a Letters Patent of the United States on, is:

1. A power-driven film winding and rewinding mechanism comprising in combination a leg-supported table; a forward extension of the central part of the front edge of the top of said table; two supports on the front edge of said table-top for reel-carrying spindles; two openings in said table-top back of each of said supports; two spindles for carrying and rotating film-reels, bearings for said spindles fixed in said supports at such an angle that the front ends of said spindles tilt upward from the horizontal, and point toward the operator, and so located that the lower parts of the circumferences of both film-reels, when mounted on said spindles, are below the horizontal plane of said table-top, and the entire film-reels are back of the front edge of said forward-extension of said table-top, so that the portion of film extending from one reel to the other is back of the front edge of and over said forward-extension of said table-top; two keys, one attached to each spindle, adapted to engage key-seats in standard film-reels; two spindle pulleys, one attached to the rear end of each of said spindles, and designed to be frictionally driven at their peripheries through two of said openings in said table-top; means for causing said spindle-pulleys, spindles, keys, and film-reels carried by same to rotate in opposite directions; and means for retarding and stopping the rotation of said spindle-pulleys.

2. The combination of claim 1 and further comprising as elements of the combination of said power-driven film winding and rewinding mechanism, and particularly as elements of said means for causing said spindle-pulleys, spindles, keys and film-reels to rotate in opposite directions; two friction-material-tired driving pulleys, designed to rotate said spindle-pulleys through said openings in said table-top; two countershafts attached to the under side of said table-top, to the front ends of each of which are attached one of the said friction driving pulleys; two tubular housings enclosing said countershafts; bearings in said tubular housings in which said countershafts rotate; two pairs of trunnions, one pair of said trunnions being attached to the rear end of each of said tubular housings; two pairs of supports for said trunnions attached to the under side of said table-top and in which said trunnions turn to allow the front ends of said tubular housings, together with the countershafts rotating within them and the friction driving pulleys attached to each of said countershafts to move up and down; two pairs of guides attached to the under side of said table-top and so located that when said tubular housings are raised, the said friction driving pulleys, attached to said countershafts are brought up into frictional contact with said spindle pulleys through said openings in said table-top; two springs attached to the under side of said table-top and so located, that when not compressed, they normally force the front ends of said tubular housings, and the said friction driving pulleys down and out of contact with said spindle pulleys; two approximately right-angle-shaped levers; two pairs of supports on the under side of said table-top to which said right-angle-shaped levers are hinged at approximately the apexes of their angles, and so located that the approximately horizontal members of one of said right-angle-shaped levers is under the front end of each of said tubular housings and in such a position that when said horizontal member moves upward, it causes the upward movement of the corresponding front end of said tubular housing, the front end of the countershaft rotating within it and the friction driving pulley on the front end of said countershaft so that it engages and rotates the corresponding spindle pulley by frictional contact with it; two other straight, approximately vertical knee levers hinged to the under side of said table-top, and so located that the lower ends of said knee levers may be moved outward by the knees of the operator; two bars respectively pivotally attached, at their outer ends, to the lower ends of said approximately vertical members of said right-angle-shaped levers, and at their inner ends, to the lower ends of said knee-levers, so that movement outward of an operator's knee causes the frictional engagement of one of the friction driving pulleys with one of said spindle pulleys; two grooved belt pulleys, one attached to the rear end of each of said countershafts; an electric motor attached to the under side of said table-top with its shafts approximately parallel with said countershafts, a double grooved driving pulley attached to said shaft of said motor; two belts connecting said double grooved driving pulley with the two said grooved belt pulleys on the rear ends of the countershafts, one of said belts being crossed, so that when said motor rotates, its motion is transmitted through said double grooved pulley, the two belts, the two grooved driven pulleys, the two countershafts, the two friction driving pulleys, to either one of the two spindle pulleys, the spindle attached to the spindle pulley; the key, and the film-reel carried by the spindle causing it to rotate.

3. The combination of claim 2 and further comprising as elements of the combination of said power-driven film winding and rewinding mechanism, and particularly as elements of said means for retarding and stopping said spindle pulleys, spindles, keys and film reels; two perforated discs of friction material attached to said spindle supports, located between said spindle supports and said spindle pulleys and concentric with said spindles; two right-angle-shaped levers, hinged at the apexes of their angles to the under side of said table-top, with their approximately vertical parts extending upward through two of the said openings in said table-top and bearing against the rear ends of said spindles, and with their approximately horizontal parts under said table-top; two approximately horizontal levers pivotally attached at their outer ends to supports on the under side of said table-top, and so located and supported near their inner ends that said inner ends are over the knees of the operator, so that when raised by the upward movement of the knees of the operator, they bear against the said approximately horizontal parts of said right-angle-shaped levers, and cause the approximately vertical parts of the same extending upward through said openings in said table-top, and bearing against the rear ends of said spindles, to move said spindles, axially, forward in said bearings and so bring said spindle-pulleys into contact with said discs of friction material, thereby causing the gradual retarding or stopping of the rotation of said spindle-pulleys, according to the pressure applied.

4. A power-driven film winding and rewinding mechanism comprising in combination a leg-supported table with a horizontal top; two front legs extending above said table-top; a forward extension of the central part of the front edge of said table-top; openings in said table-top, two back of each of said front legs; two spindles for carrying film reels, each spindle with a spindle pulley on its rear end adapted to be driven at its periphery through said openings back of said front legs, bearings for said spindles in said extensions of said front legs above said table-top so located that the lower parts of the circumferences of both film reels, when mounted on said spindles are below said horizontal table-top and both film reels are back of the front edge of said forward extension of said table-top so that the portion of film extending from one reel to the other is back of the front edge of and over said forward extension of said table top; keys attached to each spindle adapted to engage key-seats in standard film reels; means for causing said spindle-pulleys, spindles, keys and film reels carried by the same to rotate in opposite directions; and means for retarding and stopping the rotation of said spindle pulleys, spindles, keys, and film reels.

5. A power-driven film winding and rewinding mechanism comprising in combination a leg-supported table with a horizontal top, the two front legs extending above said table-top and inclined backward from the vertical above their junction with said table-top and forward from said vertical below said table-top; openings in said table-top, two back of each of said front legs; a forward extension of the central part of the front edge of said horizontal table-top; two spindles for carrying and rotating film reels, each with a pulley on its rear end; bearings for said spindles fixed at approximately right angles in said upper, backward-inclined part of each of said front table-legs, so that when mounted therein, the front ends of said spindles tilt upward from the horizontal, and point toward the operator, and so located that the lower parts of the circumferences of both film reels, when mounted on said spindles are below the said horizontal table-top, and both film reels are back of the front edge of said forward extension of said table-top, so that the portion of film extending from one reel to the other is back of the front edge of and over said forward extension of said table-top; a key attached to each spindle adapted to engage a key-seat in a standard film reel; two spindle pulleys adapted to be driven at their peripheries through said openings in said table-top, one attached to the rear end of each of said spindles, means for causing said spindle pulleys, spindles, keys and film reels carried by the same to rotate in opposite directions; and means for retarding and stopping the rotation of said spindle pulleys.

6. The combination of claim 5 and further comprising as elements of the combination of said power-driven film winding and rewinding mechanism, and particularly as elements of said means for causing said spindle pulleys, spindles keys and film reels to rotate in opposite directions; two friction material-tired driving pulleys, designed to rotate said spindle pulleys by frictional contact with the lower portions of the peripheries of said spindle pulleys through said openings in said table-top; two countershafts attached to the under side of said table-top, to the front ends of each of which are attached one of the said friction driving pulleys; two tubular housings enclosing said countershafts; bearings in said tubular housings in which said countershafts rotate; two pairs of trunnions, one pair of said trunnions being attached to the rear end of each of said tubular housings; two pairs of supports for said trunnions attached to the underside of said table top and in which said trunnions turn to allow the front ends of said tubular housings, together with the countershafts rotating within them and the friction driving pulleys attached to each of said countershafts to move up and down; two pairs of guides attached to the under side of said table-top and so located that when said tubular housings are raised, the said friction driving pulleys, attached to said countershafts are brought up into frictional contact with said spindle pulleys through said openings in said table-top; two springs attached to the under side of said table-top and so located that when not compressed, they normally force the front ends of said tubular housings, and the said friction driving pulleys down and out of contact with said spindle-pulleys; two approximately right-angle-shaped levers;

two pairs of supports on the under side of said table-top to which said right-angle-shaped levers are hinged at approximately the apexes of their angles, and so located that the approximately horizontal member of one of said right-angle-shaped levers is under the front end of each of said tubular housings and in such position that when said horizontal member moves upward, it causes the upward movement of the corresponding front end of said tubular housing, the front end of the countershaft rotating within it, and the friction driving pulley on the front end of said countershaft so that it engages and rotates the corresponding spindle pulley by frictional contact with it; two other straight, approximately vertical levers hinged to the under side of said table-top, and so located that the lower ends of said levers may be moved outward by the knees of the operator and hereinafter called knee levers; two bars respectively pivotally attached, at their outer ends to the lower ends of said approximately vertical members of said right-angle-shaped levers, and at their inner ends, to the lower ends of said knee levers, so that the movement outward of an operator's knee causes the frictional engagement of one of the driving pulleys with one of the said spindle pulleys; two grooved belt-pulleys, one attached to the rear end of each of said countershafts; an electric motor attached to the under side of said table-top with its shaft approximately parallel with said countershafts; a double grooved driving pulley attached to said shaft of said motor; two belts connecting said double grooved driving pulley with the two grooved belt pulleys on the rear ends of the countershafts, one of said belts being crossed, so that when said motor rotates, its motion is transmitted through said double grooved pulley, the two belts, the two grooved driven pulleys, the two countershafts, the two friction driving pulleys, to either one of the two spindle pulleys.

7. The combination of claim 6 and further comprising as elements of the combination of said power-driven film winding and rewinding machine, and particularly as elements of said means for retarding and stopping the rotation of said spindle pulleys, spindles, keys and film reels; two perforated discs of friction material attached to said table leg extensions, located between said table-leg extensions and said spindle pulleys, and concentric with said spindles; two right-angle-shaped levers, hinged at the apexes of their angles to the under side of said table top and with their approximately vertical parts extending upward through two of the said openings in said table-top and bearing against the rear ends of said spindles, and with their approximately horizontal parts under said table-top; two approximately horizontal levers pivotally attached at their outer ends to supports on the under side of said table-top and so located and supported near their inner ends that said inner ends are over the knees of the operator, so that when raised by the upward movement of the knees of the operator they bear against the said approximately horizontal parts of said right-angle-shaped levers, and cause the approximately vertical parts of the same extending upward through said openings in said table-top, and bearing against the rear ends of said spindles, to move said spindles, axially, forward in said bearings and so bring said spindle pulleys into contact with said discs of friction material, thereby causing the gradual retarding or stopping of the rotation of said spindle-pulleys, according to the pressure applied.

LEANDER WALTER MILLSAP.

REFERENCES CITED

The following references are of record in the file of this patent:

UNITED STATES PATENTS

| Number | Name | Date |
|---|---|---|
| 1,113,633 | Hoover | Oct. 13, 1914 |
| 1,215,066 | Shipman | Feb. 6, 1917 |
| 1,565,931 | Haley | Dec. 15, 1925 |
| 1,658,137 | Neracher | Feb. 7, 1928 |
| 1,874,953 | Franzen et al. | Aug. 30, 1932 |
| 2,180,793 | Carlson | Nov. 21, 1939 |

FOREIGN PATENTS

| Number | Country | Date |
|---|---|---|
| 323,327 | Great Britain | Jan. 2, 1930 |